(12) United States Patent
Englander

(10) Patent No.: US 7,455,413 B2
(45) Date of Patent: Nov. 25, 2008

(54) RETRACTABLE REARVIEW MIRROR INCLUDING A REBOUNDING MECHANISM

(75) Inventor: Benjamin Englander, Jamaica, NY (US)

(73) Assignee: Rosco, Inc., Jamaica, NY (US)

( * ) Notice: Subject to any disclaimer, the term of this patent is extended or adjusted under 35 U.S.C. 154(b) by 0 days.

(21) Appl. No.: 11/078,749

(22) Filed: Mar. 11, 2005

(65) Prior Publication Data

US 2005/0213232 A1    Sep. 29, 2005

Related U.S. Application Data

(63) Continuation-in-part of application No. 10/083,306, filed on Feb. 25, 2002, now Pat. No. 6,883,923.

(51) Int. Cl.
*B60R 1/076*    (2006.01)

(52) U.S. Cl. .................. 359/841; 359/844; 248/478

(58) Field of Classification Search ................ 359/841, 359/871, 872, 881, 844; 248/477–479
See application file for complete search history.

(56) References Cited

U.S. PATENT DOCUMENTS

| | | | | |
|---|---|---|---|---|
| 3,784,149 | A * | 1/1974 | Brudy | ......................... 248/478 |
| 4,422,724 | A | 12/1983 | Otsuka et al. | |
| 4,623,115 | A * | 11/1986 | Brester | ......................... 248/479 |
| 4,789,232 | A * | 12/1988 | Urbanek | ....................... 248/549 |
| 5,005,963 | A * | 4/1991 | Schmidt et al. | .............. 359/868 |
| 5,081,546 | A * | 1/1992 | Bottrill | ......................... 359/841 |
| 5,137,247 | A * | 8/1992 | Lang et al. | ................... 248/549 |
| 5,364,058 | A * | 11/1994 | Shepherd | ...................... 248/479 |
| 5,722,629 | A * | 3/1998 | Lang et al. | ................... 248/479 |
| 6,273,574 | B1 * | 8/2001 | Phillips | ....................... 359/841 |
| 6,286,968 | B1 * | 9/2001 | Sailer et al. | .................. 359/872 |
| 6,371,620 | B1 * | 4/2002 | Lang et al. | ................... 359/872 |
| 6,883,923 | B2 * | 4/2005 | Englander | .................... 359/841 |
| 2004/0036000 | A1 * | 2/2004 | Courbon | ...................... 248/478 |
| 2005/0219722 | A1 * | 10/2005 | Watrous et al. | .............. 359/841 |

FOREIGN PATENT DOCUMENTS

JP        03199708 A  *  8/1991
JP        10138835 A  *  5/1998

\* cited by examiner

*Primary Examiner*—Alessandro Amari
*Assistant Examiner*—Mark Consilvio
(74) *Attorney, Agent, or Firm*—Irah H. Donner; Wilmer Cutler Pickering Hale and Dorr LLP

(57) ABSTRACT

A mirror assembly for trucks, vans and the like, for providing front or rear viewing as the vehicle is moving forward or is backing up, for example, into a truck loading dock area. The mirror assembly comprises a mirror unit that is connected by a mirror arm to a support structure, e.g., a flange or bracket, that is fixed to the vehicle. The support structure projects minimally sideways of the vehicle and pivotably supports the mirror arm in a manner whereby the mirror unit and its arm can swing about a pivot axis, enabling the mirror and its arm to lie alongside a side wall of the vehicle or tightly against the rear of the vehicle. A return or rebound mechanism returns the mirror unit to its normal operational position automatically, once contact with an obstruction that has pivoted the mirror unit from its normal position, has been removed.

12 Claims, 16 Drawing Sheets

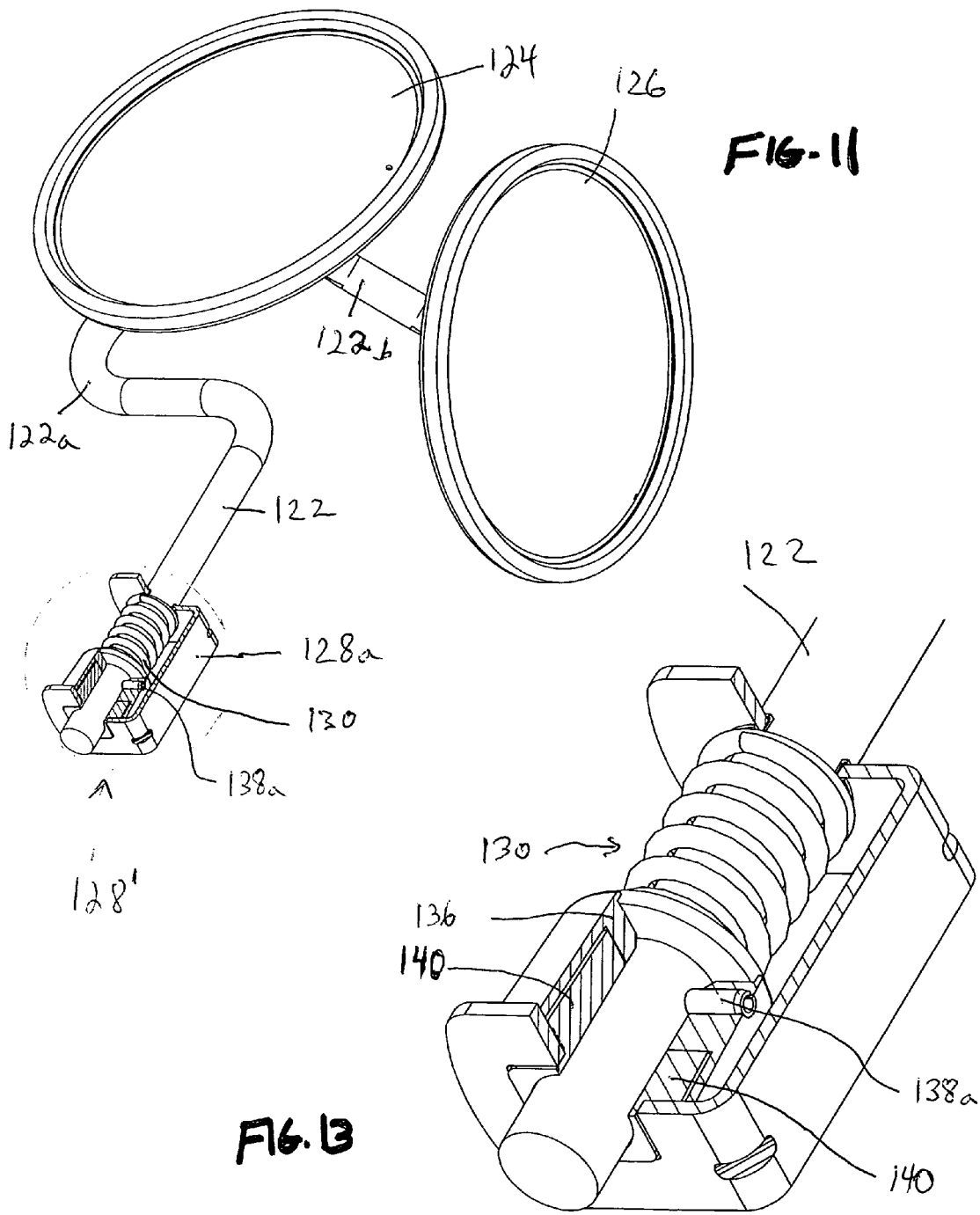

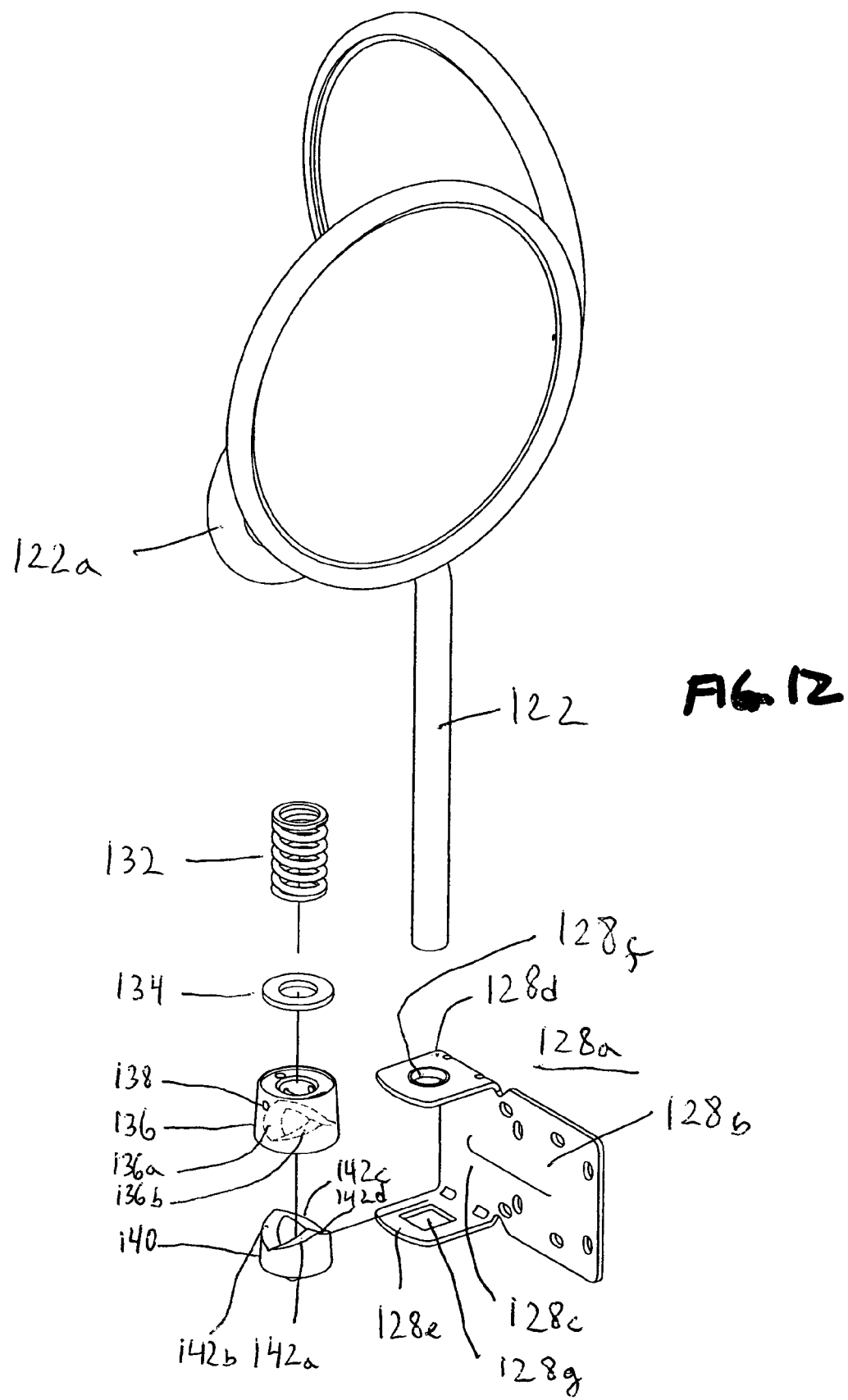

RETRACTABLE REARVIEW MIRROR INCLUDING A REBOUNDING MECHANISM

CROSS REFERENCE TO RELATED APPLICATIONS

This is a continuation-in-part of U.S. patent application Ser. No. 10/083,306 filed Feb. 25, 2002, and issued on Apr. 26, 2005 as U.S. Pat. No. 6,883,923, by Benjamin ENGLANPER entitled RETRACTABLE REAR VEW MIRROR.

BACKGROUND OF THE INVENTION

The present invention relates to front and rear mounted mirror assemblies for motor vehicles and, more particularly, pertains to a mirror assembly primarily for vehicles such as trucks, vans and the like that do not provide direct rear and/or cross-view viewing as the vehicle is being backed up, for example, into a truck loading dock area, or mirror assembly whose mirror orientation is subject to being disturbed due to any cause.

The use of vehicle mirror devices is known in the prior art. Conventional vehicle mirrors are available and have been utilized for many years for the purpose of aiding the vision of drivers, when backing up their vehicles. These types of mirrors basically consist of familiar, expected and known structural configurations comprising a variety of differently shaped mirrors of various types that are mounted rigidly or hingedly, at forward locations or at the rear of the vehicles.

The prior art is exemplified by U.S. Pat. No. 5,825,564 to Mazarac, which mounts a mirror structure on a rear surface of the vehicle, in a manner which projects an image through a rear window of the vehicle to the rear view mirror located forward of the driver, inside the vehicle.

U.S. Pat. No. 6,302,550 to Krieg describes a rear mounted mirror assembly for motor vehicles, including a base member coupled to a rear panel of a motor vehicle. A pair of plates are provided, one of which is fixed to the rear surface of the vehicle, with the other being hingedly attached thereto and supporting a pole or telescoping arm to which a convex mirror is attached. The convex mirror can be pivoted to project sidewise of the vehicle, in a manner that projects an image of the space behind the vehicle to the front of the vehicle or, more specifically, to the side view mirror of the driver. Thereby, the driver is able to see other vehicles and obstructions when backing out of a parking spot.

A conventional style, side-view mirror which is attached to either the driver door or to the driver-side front fender is described in U.S. Pat. No. 6,239,928 to Whitehead, et al. That mirror is able to pivot about a pivoting axis, so that if it hits an obstruction, it does not break off. It is also provided with a plurality of detents at which its pivoting position can be fixed.

Conventional side-view mirrors are typically located near the driver, within hand reach. Or, they are adjustable electrically through remote operation. In any event, if such a side-view mirror is hit by an obstruction, or needs to be moved to accommodate a tight space, the driver can simply reach out and pivot the mirror body to avoid hitting obstacles. This is not easily done with rear mounted mirror assemblies that are mounted on a rear surface of a truck or van or with mirror assemblies located on the front fenders.

The present applicant is further unaware of any rear mounted mirror assembly that is capable of swinging out of the way when encountering an obstruction and thereafter automatically returning to its original position when the contact with the obstruction has ceased.

SUMMARY OF THE INVENTION

It is an object of the present invention to provide a simple to use rear or front mounted mirror assembly for mirror vehicles such as trucks, vans and the like.

It is another object of the present invention to provide a mirror assembly that is simple and inexpensive to construct.

A further object of the invention is to provide a mirror assembly that permits the vehicle to back up or drive against a wall or the weather stripping surrounding the door of a loading dock, without causing damage to the mirror assemblies or to the vehicle.

It is yet another object of the present invention to provide a rear mounted mirror assembly that is particularly suitable for backing up trucks or vans into tight spaces, such as those that are bound by a pair of sidewalls, whose separation is comparable to the width of the vehicle.

Yet another object of the invention is to provide mirror assemblies that increase safety and facilitate driving.

The foregoing other objects of the invention are realized with a rear mounted mirror assembly in accordance with the present invention which comprises a mirror unit that is connected by a mirror arm to a support structure, e.g., a flange or bracket, that is fixed to the vehicle. The support structure projects sideways of the vehicle and pivotally supports the mirror arm in a manner whereby the mirror unit and its arm can swing about a pivot axis, enabling the mirror and its arm to lie alongside a sidewall of the vehicle or tightly against the rear of the vehicle, or swing about a vertical pivot axis when mounted on the front fender of a vehicle.

In accordance with further embodiments of the invention, the mirror assembly includes a return or rebound mechanism which automatically returns the mirror to a normal or original position when contact with an obstruction has ceased. Preferably, the mirror unit comprises a convex mirror and the mounting bracket is mounted to the driver-side, side wall of the vehicle and the mirror unit is so positioned that it is capable of reflecting an image from an area facing the rear wall of the vehicle to the driver-side, side-view mirror.

In accordance with further embodiments of the invention, the mirror arm is so shaped as to surround the perimeter of the mirror unit, so that obstructions make contact with the mirror arm, rather than with the mirror unit, so as not to disturb the positioning of the mirror unit relative to the arm. Still further embodiments of the invention incorporate into the mirror assembly electromechanical apparatus that senses the contact with an obstruction and automatically pulls the mirror assembly away from its normal position, as needed for protection. A further electromechanical mechanism is coupled to the electrical system of the truck or the van and pulls the rear mounted mirror assembly behind the truck or the van during normal driving conditions, in order to improve aerodynamics, avoid the mirror contacting tree branches, or other obstructions during normal driving conditions.

Further embodiments allow the mirror assembly to be mounted on the front fender, to absorb impacts applied thereto from front, rear and sideways directions and to rebound to its desired, pre-adjusted position upon removal of the impacting forces.

Other features and advantages of the present invention will become apparent from the following description of the invention which refers to the accompanying drawings.

BRIEF DESCRIPTION OF THE DRAWINGS

FIG. 11 shows the mirror assembly of FIG. 10 from a different perspective.

FIG. 12 shows the mirror assembly of FIG. 10 with the swiveling and rebounding mechanism in an exploded view.

FIG. 13 is an enlargement of a portion of the circled portion of FIG. 11.

DETAILED DESCRIPTION OF THE DRAWINGS

Figure 1:
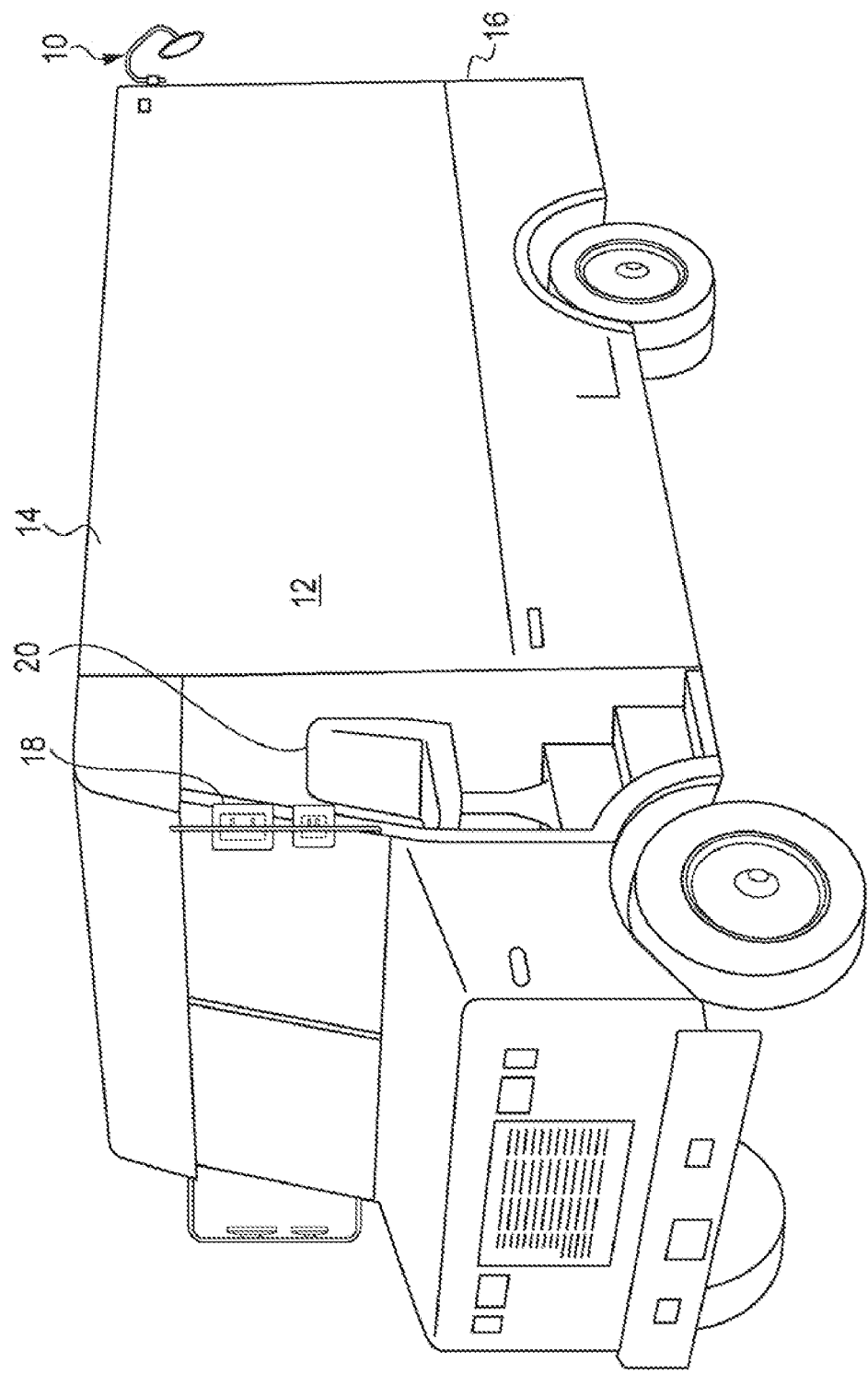
FIG. 1 perspectively shows a truck with the rear mounted mirror assembly of the present invention mounted thereto.
Figure 2:
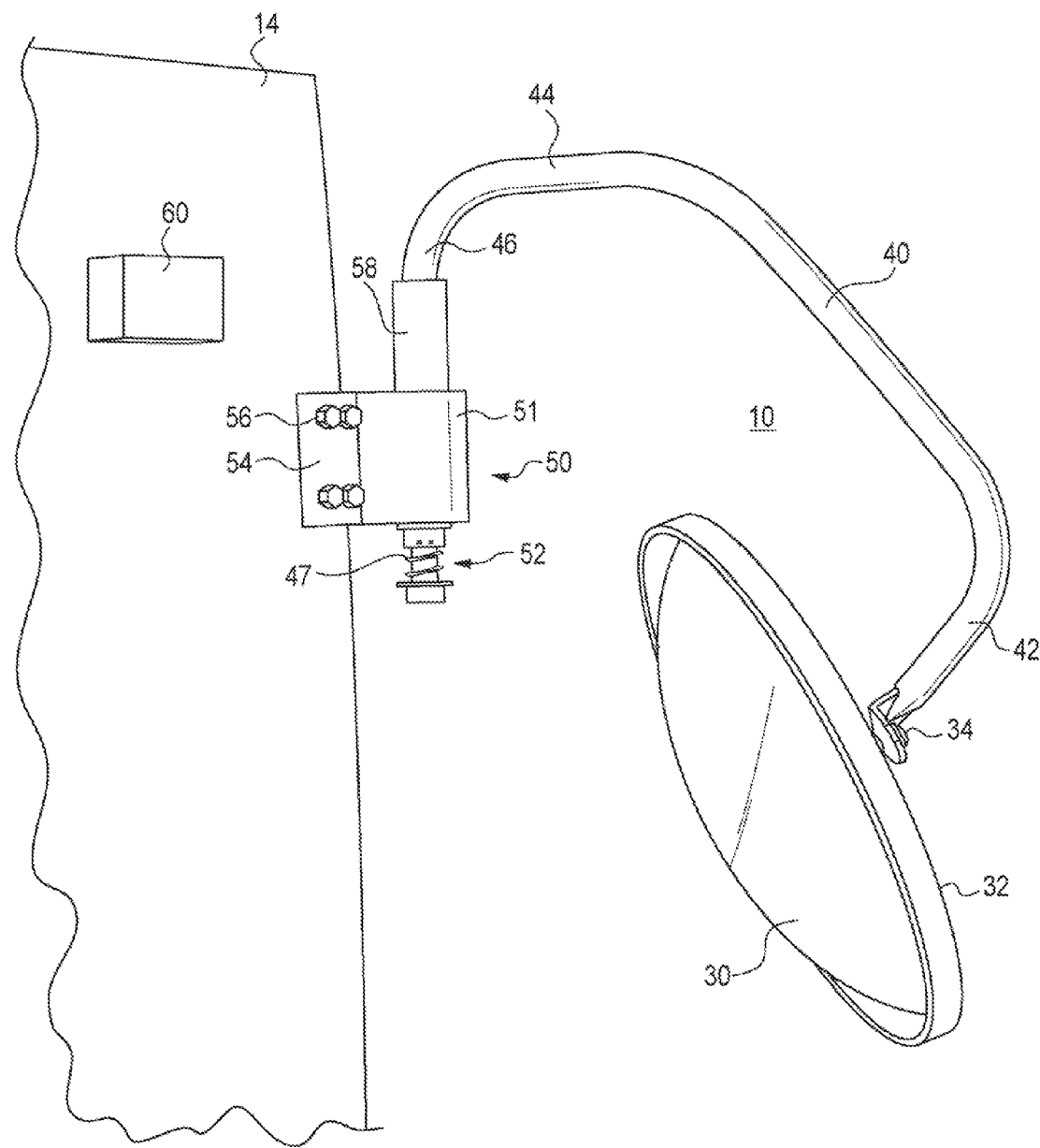
FIG. 2 is an enlargement of a portion of FIG. 1.

With reference to FIGS. 1 and 2, a rear mounted mirror assembly 10 for a vehicle 12 is shown mounted at or very close to the rear end, at the left hand side panel or wall 14 of the vehicle 12. An image reflected by the mirror unit 30, which shows the general space behind and to the sides of the vehicle 12 is reflected to the front mounted, side-view mirror 18, enabling the driver in the driver seat 20 to safely backup or to survey the environment in and about the rear panel or wall 16 of the vehicle 12.

The rear mounted mirror assembly 10 essentially comprises the mirror unit 30 which is swivelably attached to one end of a mirror support arm or pole 40, whose other terminal end 47 is rotatably or pivotably mounted in a bracket or flange 50. The bracket 50 is fixedly attached to the side wall 14 or to the rear wall 16 of the vehicle 12. The bulk of the rear mounted mirror assembly, including the arm 40 and the mirror unit 30, projects sideways and to the rear relative to the vehicle 12.

Some loading docks have U-shaped, foam-based weather strippings around the loading dock openings (not shown), against which a vehicle, such as the truck 12, backs up for making deliveries, enabling sealing the interior of the truck to the loading dock. This prevents the cold, rain or winter elements from affecting the interior of the loading dock. In any event, trucks sometimes need to back up very close against a solid wall. In all cases, the mirror assembly 10 of the present invention will interfere with the backing up operation against the weather stripping of loading docks or such rear walls.

In accordance with one feature of the present invention, the mirror assembly is outfitted with a mechanism that enables the mirror assembly structure to rotatably or movably yield to the pressure from the obstruction, in a manner which prevents the mirror assembly from breaking or distorting or from damaging surfaces of the vehicle or loading dock, etc. Thus, the mirror assembly 10 rotates or pivots or moves out of the way of the obstruction. Secondarily, the mirror assembly of the present invention also incorporated a mechanism which restores the mirror to its original, predetermined position once contact with the obstruction has ended.

With further reference to FIG. 2, the mirror unit 30 includes a circumscribing gasket or border 32 and a rear mounted pivotable screw mechanism 34 by which the mirror unit 30 is attached to the hole portion of the arm 40. The arm or pole has a first section 42 that bends into a second section 44 and bends again to form a third section 46 which comprises the terminal end of the arm which is pivotably received in the bracket 50. The bracket 50 has a main body portion 51 which defines an opening in which a sleeve 56 is located. The sleeve in turn rotatably holds the arm portion 46, which protrudes from the bottom of the bracket body 51, in a manner whereby the arm is normally resiliently biased to be pulled deeper into the opening by a spring 52. A flange portion 54 of the bracket 50 is affixed by a plurality of screws 56 or by welding or by any fastening means to the side wall 14 or, optionally, to the rear panel 16 of the vehicle 12. A shock-absorbing stopper or protector 60 assures that the mirror unit 30 will not be damaged or cause damage as it swings against the side wall 14 of the vehicle 12.

Figure 3:
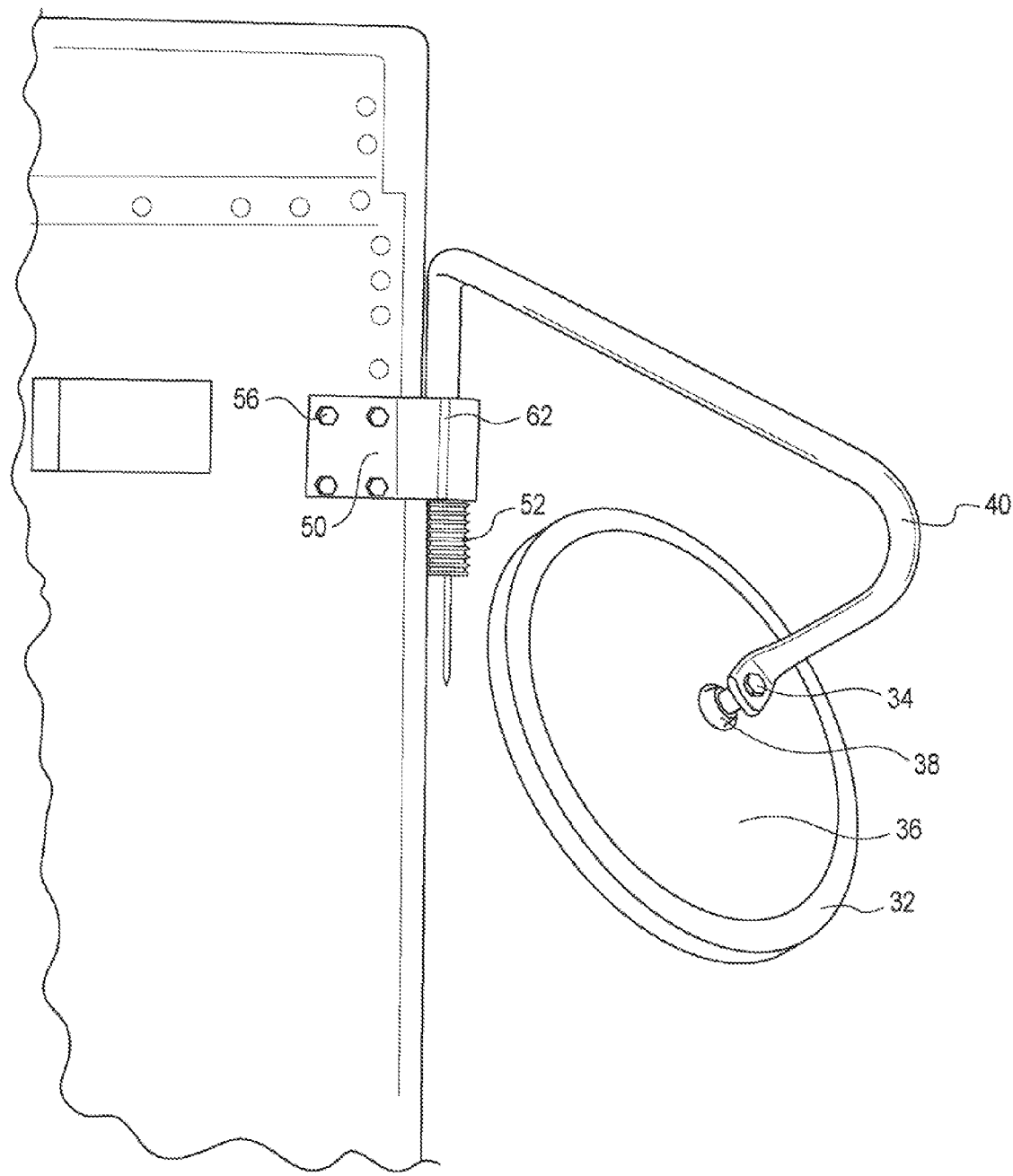
FIG. 3 is a further perspective showing a detail of the mirror support assembly of FIGS. 1 and 2.

FIG. 3 shows the ball and socket swivel arrangement 38 for the screw mechanism 34, which is mounted at the rear panel 36 of the mirror unit 30. Further illustrated is a detent 62 in the main body of the bracket 50, which engages a corresponding depression (not shown) in the terminal arm portion 46, to define a precise, predetermined, normal rotational position for the mirror arm 40.

Figure 4:
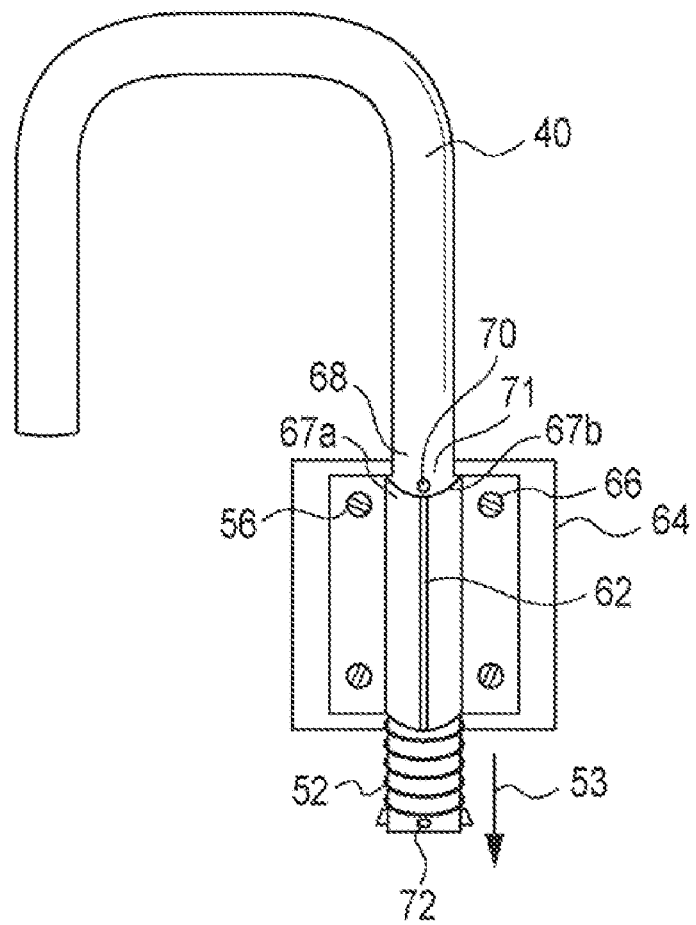
FIG. 4 provides a diagram of the mirror assembly of the present invention.

In accordance with one aspect of the present invention, the mirror assembly 10 is provided with a return or rebound mechanism that automatically restores the arm and, therefore, the mirror unit 30 that it holds, to the normal position. The operation of such return mechanism is shown by reference to the somewhat differently constructed bracket assembly illustrated diagrammatically in FIG. 4. In this figure, the arm 40 is supported in a bracket that has a base piece 64 which, together with a cover piece 66, defined therebetween a cylindrical opening for the arm 40. The terminal end of the arm 40 extends beyond the cylindrical opening and is resiliently biased to pull the arm deeper into the opening by the normally compressed spring 52, which presses both against the terminal bottom side of the overall bracket and the protruding pin 72 that passes through the terminal end of the arm 40.

The downward biasing force of the spring 52 is restrained by a pin 70, which passes through the arm 40 above the bracket and which rests inside a V-shaped opening 68 that is defined in the cover piece 66 of the bracket.

Operationally, when the arm 40 is rotated in the cylindrical opening, the pin 70 bears tightly against the sloping surfaces 67a and 67b which define the V-shaped cutout in the bracket 66, causing the arm 40 to rise in the opening against the force of the spring 52. However, as soon as the rotational force on the arm 40 is removed, the counterforce exerted by the spring 52 in the direction of the arrow 53 causes the pin to rotate the arm 40 to restore the mirror's angular position to its original state.

Figure 5:
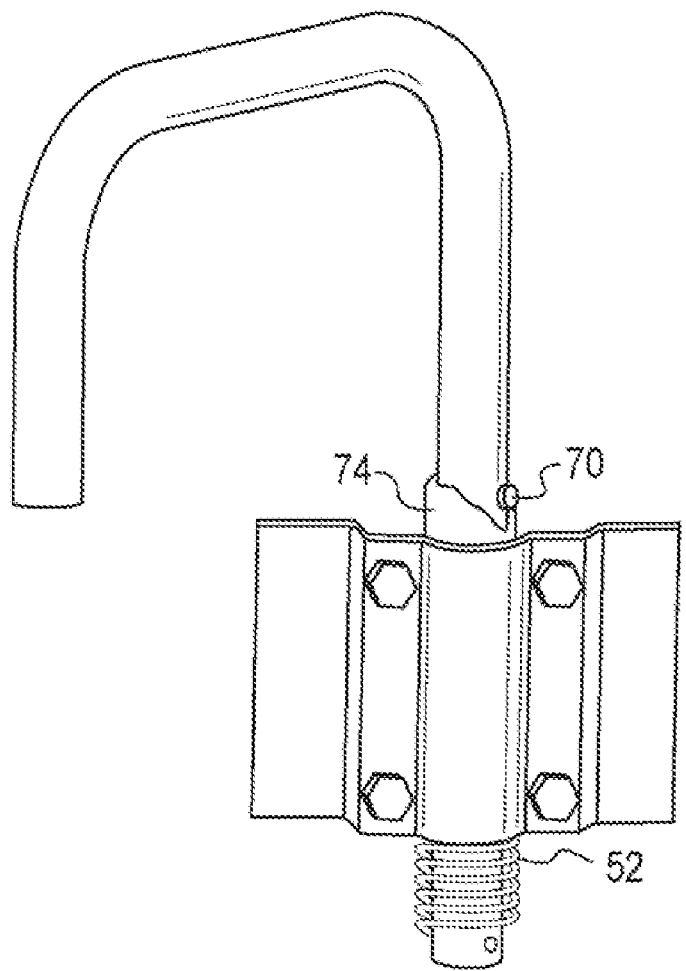
FIG. 5 is a further perspective showing a different embodiment for the construction of the bracket assembly for the mirror unit of the present invention.

The mounting bracket can be connected to the vehicle by a plurality of screws 56. Moreover, the normal position of the mirror 40 is precisely defined due to a detent and snap structure 62, whereby a portion of the arm snaps into a corresponding detent structure in the bracket. Also, the round pin 70 can be formed as an inverted triangle 71 to provide better traction and structural strength, and be so formed on the arm 40 as to complement the shape of the cutout 68. FIG. 5 shows the construction of FIG. 4, with the minor variant that the cutout 70 is provided in a separate sleeve portion 74.

Figure 6A:
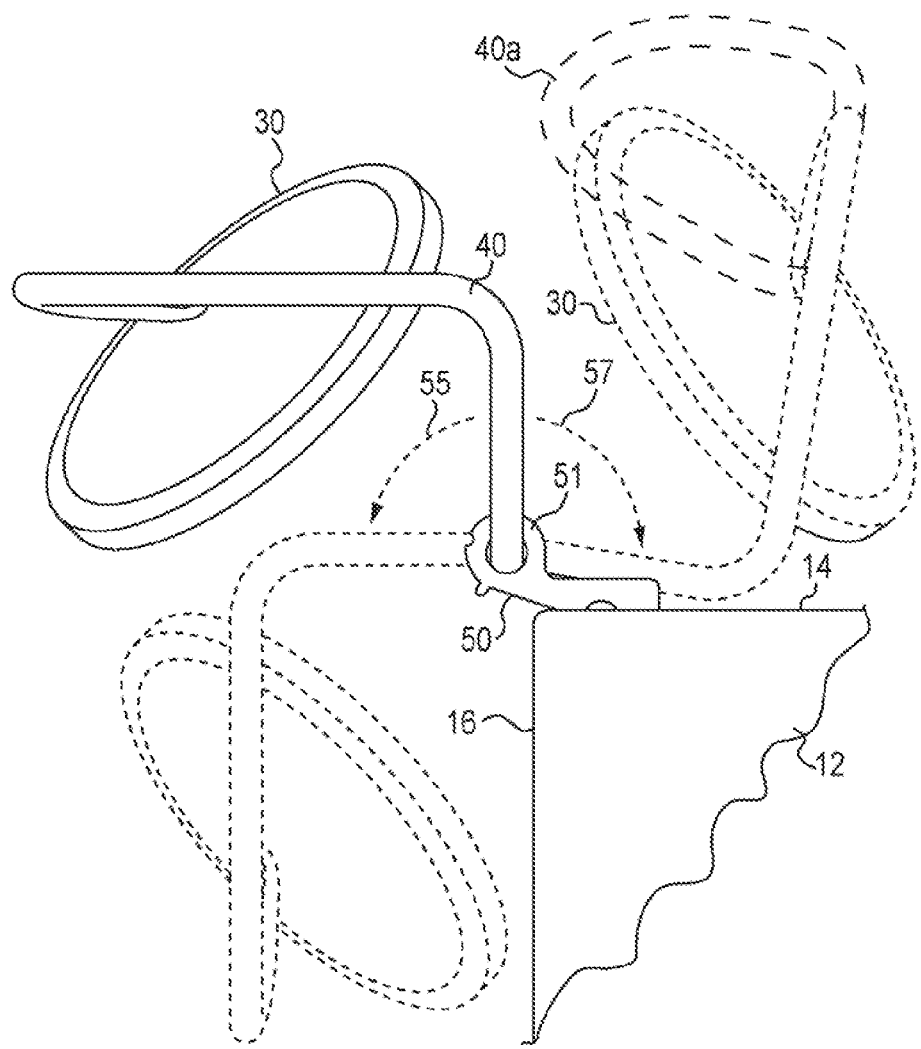
FIG. 6a is an illustration showing the range of movement of the mirror assembly of the present invention.

The range of pivoting movement of the mirror assembly 10 is illustrated in FIG. 6a, showing the mirror unit 30 against either the side panel 14 or the rear panel 16 of the vehicle 12. As shown, the mirror has a normal position at which it provides the optimal image that is reflected to the driver's side view mirror. Thus, if the truck 12 backs up against a solid wall, the mirror assembly is rotated clockwise in the direction of the arrow 57. Indeed, an obstruction has the ability of pivoting the mirror arm to a degree that it could come to bear against the side wall of the side panel 14, protected by the resilient stopper, shown in FIG. 2. Thus, the entire mirror assembly can be pushed back due to its engagement with an obstruction, without breaking. However, as soon as the truck moves away from the obstruction, the mirror automatically snaps back or rebounds to its normal position. Similarly, if the mirror assembly engages or contacts a side wall, the mirror assembly can swing counterclockwise in the direction of arrow 55, whereby it becomes positioned behind the rear panel 16 of the truck 12.

Figure 6B:
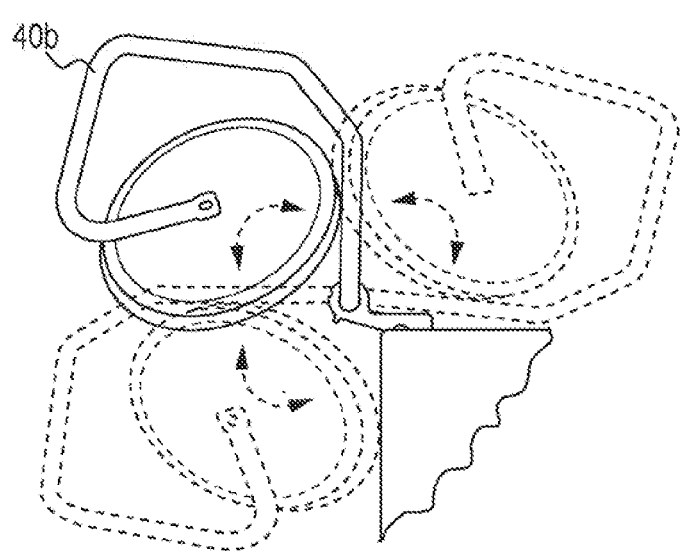
FIG. 6b shows a modified mirror arm shape for the mirror assembly of the present invention.

Shown in dashed lines 40a is a somewhat differently shaped arm 40 for the mirror unit 30, which is so constructed that it partially, or substantially fully surrounds the mirror unit 30 in such a manner that in normal use, it is the arm, rather than the mirror unit 30 that engages the obstruction. This assures that the swivelably mounted mirror unit's position relative to the mirror arm will not be altered. FIG. 6b shows another variant, i.e., a differently shaped mirror bracket 40b.

Figure 7A:
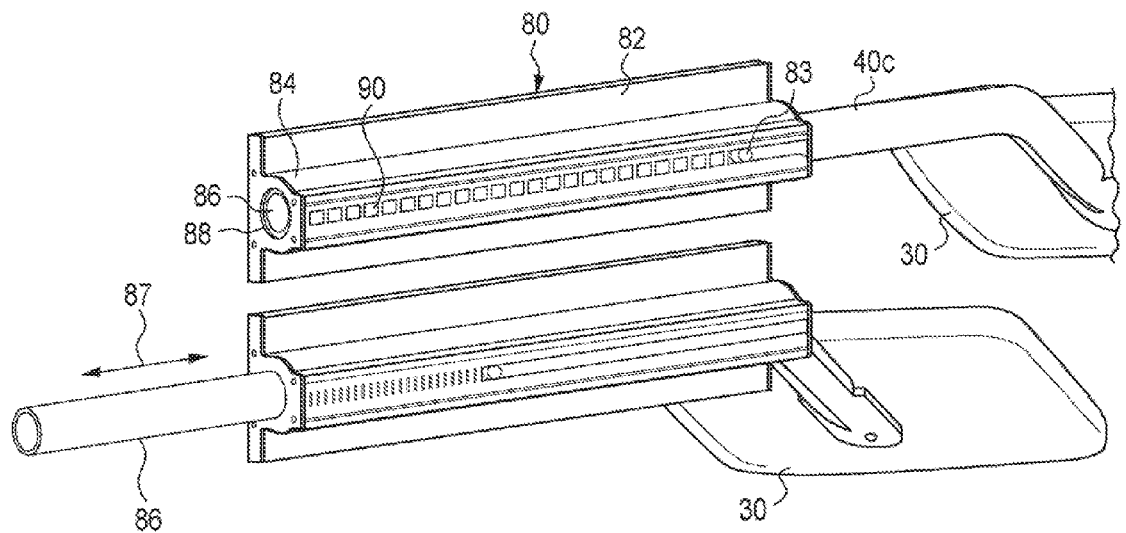
FIGS. 7a and 7b perspectively illustrate modified mirror arms and support brackets for the mirror of the present invention.

In the mirror assembly shown in FIG. 7a, the differently shaped mirror arm 40c is slidingly (rather than rotatably) received in a slider bracket 80 which comprises a base 82, which is affixed to the vehicle by any known means (not shown), e.g., screws, etc. and which comprises and defines a cylindrical opening 88 in which the terminal portion 86 of the arm 40c slidingly received. In normal use, the arm 40c is biased outwardly by a spring 90 which bears against a pin 83, disposing the mirror assembly to the side and rear of the vehicle 12. However, if the mirror assembly unit 30 is pressed against an obstruction, the arm 40c exerts a force against spring 90, causing the terminal end 86 thereof to protrude and the mirror assembly to slide in until the rear of the truck, rather than the mirror, engages the obstruction. However, as soon as the obstruction force is removed, the mirror returns to its original position. The sliding motion of the mirror unit is indicated by the two-sided arrow 87.

Figure 7B:
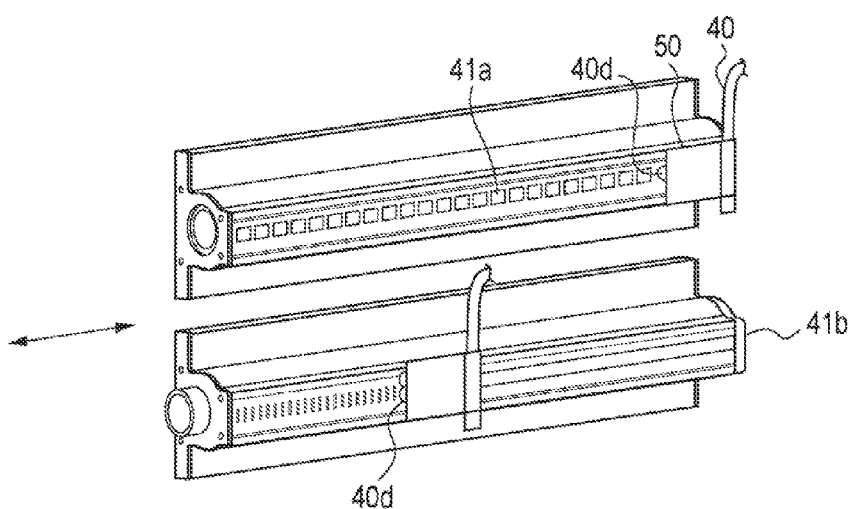

FIG. 7b illustrates the slider mechanism of FIG. 7a, except that instead of the arm 48 being received in the sliding cylinder, a short tubular bracket 40d affixed to the underside of the bracket 50 by a narrow web that is thinner than the opening 41a into the cylindrical channel 88, slides within the channel 88. The bracket is otherwise the bracket 50 of FIGS. 1 and 2. This enables the bracket which supports the arm 40 to slide in the structure 80 in the manner described above. Thus, the arrangement of FIG. 7b enables the mirror unit 30 to both rotate, as well as slide relative to the truck 12. The stopper 41b prevents the bracket 50 from sliding out of the channel 88.

In a further embodiment, a pair of parallel ones of the cylindrical opening 88 is provided in the slider bracket 80 and the bracket 50 is provided with a pair of the short tubes 40d, thus protecting the bracket 50 against twisting.

Figure 8:
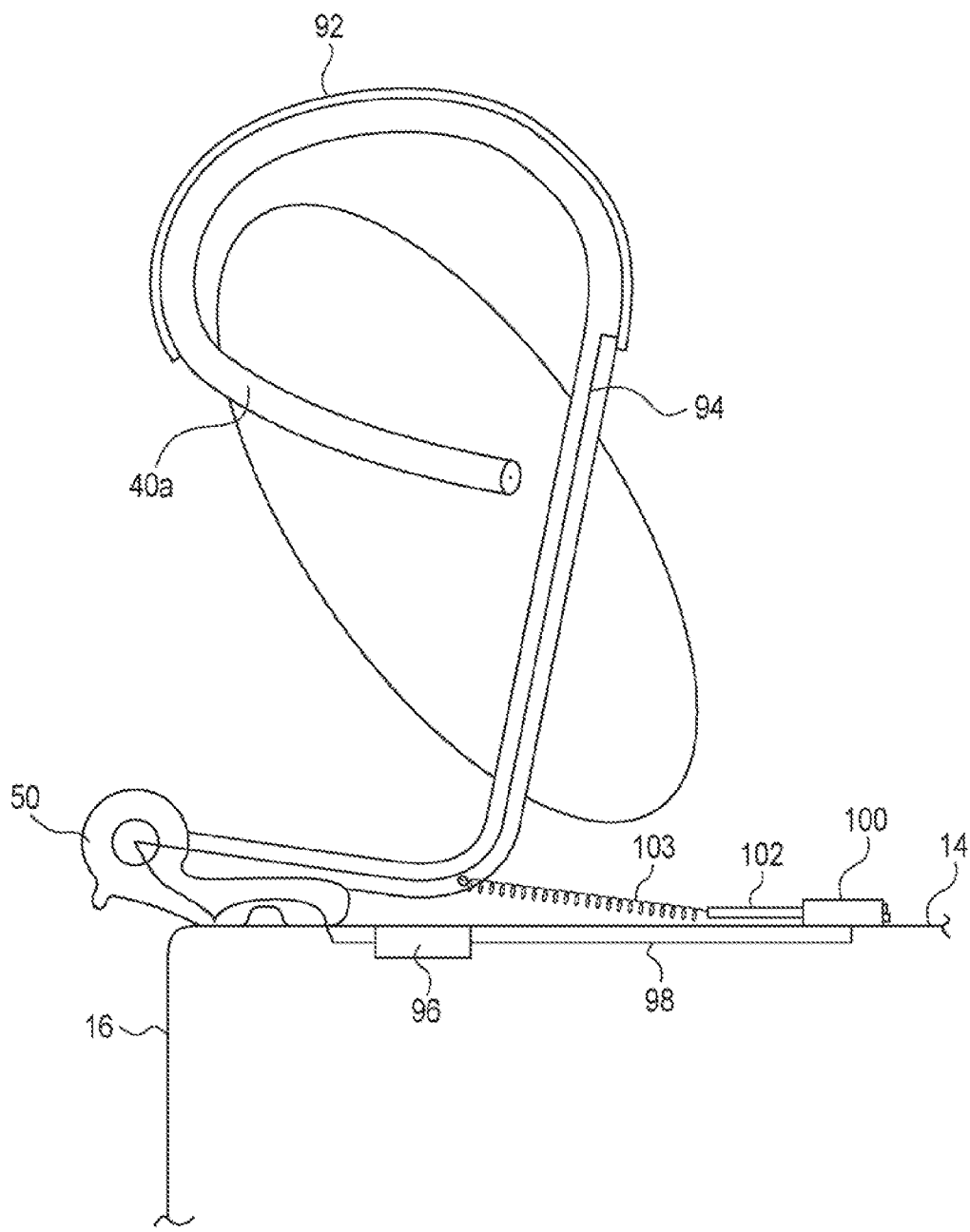
FIG. 8 shows an electrically actuatable rear mounted mirror assembly of the present invention, in accordance with another variation thereof.

FIG. 8 illustrates an electrically operable embodiment in which the overall mirror assembly is capable of being pulled back by an electrical mechanism comprising a cylinder or solenoid 100 that serves to pull the entire mirror assembly backward against the side panel of the truck 12. In this embodiment, the arm 40a is fitted with an electrical contact detector strip 92 which, whenever touched by any obstruction, sends an electrical signal over wire 94, which wire passes through the arm 40a into the bracket 50 and then to an electrical box 96 located on either side or inside the vehicle 12. The electrical mechanism 96 sends a signal over the wire 98 to the solenoid 100, causing its telescopic arm 102 to contract, and thus pull the arm 48, via a spring 103, against the force exerted in the bracket 50 to the position shown. As soon as contact with the obstruction is lost, the contact strip 92 removes its signal and the mirror rapidly returns to its original position.

Figure 9:
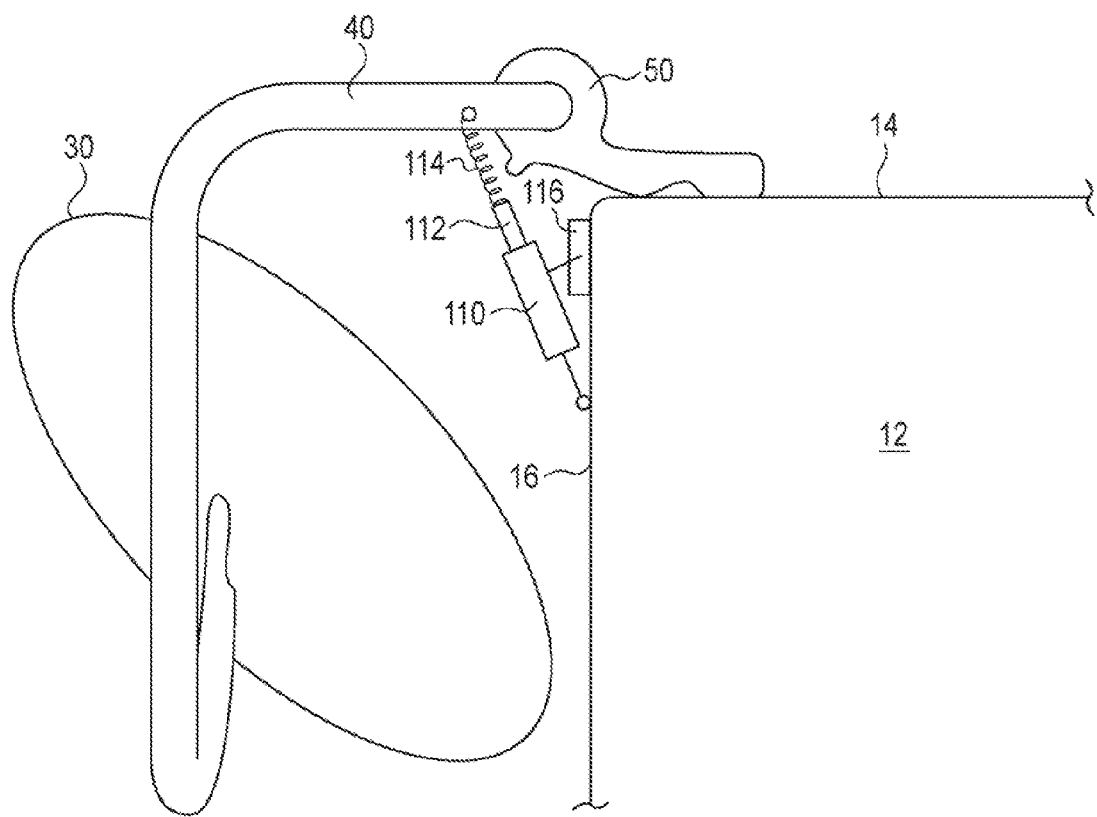
FIG. 9 shows a further electromechanical assembly for keeping the mirror unit of the rear mounted mirror assembly behind the truck during normal driving conditions to improve the aerodynamics and avoid hitting obstructions.

The electrical system described above is intended not to interfere with the ability of the mirror to swing not only alongside, but also behind the truck 12. The inventor herein also contemplates providing that arrangement in the rear of the truck and operate it so that the mirror unit is normally pivoted behind the truck during normal driving and is allowed to swing to its normal position only when the truck is operated in reverse gear. For this embodiment, the signal for operating the cylinder 110 (FIG. 9) that is located at the rear of the truck is provided to the electrical controller 116 from within the driver compartment or by tapping the reverse light signal or by placing a photoptical sensor over the backup light to produce such a signal, whereby only when the vehicle is being backed up is the mirror unit in its extended position. Thus, during the normal driving conditions, the cylinder 110 will be so energized through the telescoping arm 112 and the spring 114, as to pull the arm 40 toward the rear of the vehicle, improving the aerodynamics of the overall vehicle, and preventing the mirror unit from snagging tree branches or other obstructions. However, as soon as the vehicle is placed in reverse gear, the electrical controller 116 is so controlled that the cylinder removes its force and enables the arm 40 to rebound or snap back to what has been earlier termed as its "normal" position.

Heretofore, the mirror assemblies of the present invention with their mechanism for allowing swiveling of the mirror units and the rebounding of the mirror units to their original position have been shown in connection with embodiments that have illustrated the placement thereof toward the rear of a vehicle. However, as would be readily apparent to one of ordinary skill in the art, the same mirror structure can be placed on locations which are more forward, or even at the very front end, on the front fender of a vehicle.

Figure 16:
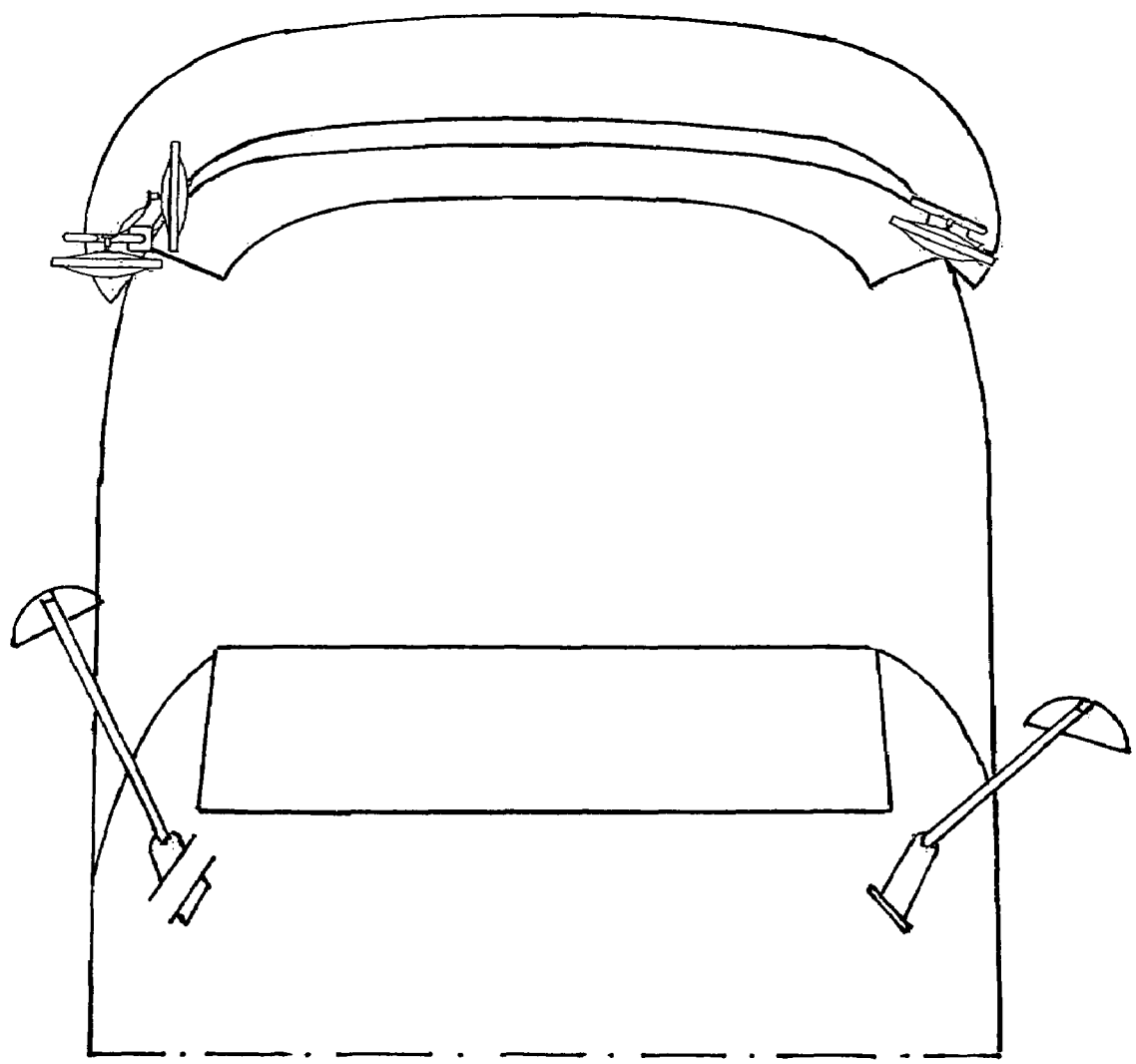
FIG. 16 shows an assembly such as in FIG. 11 mounted on a front fender of a vehicle.
Figure 16A:
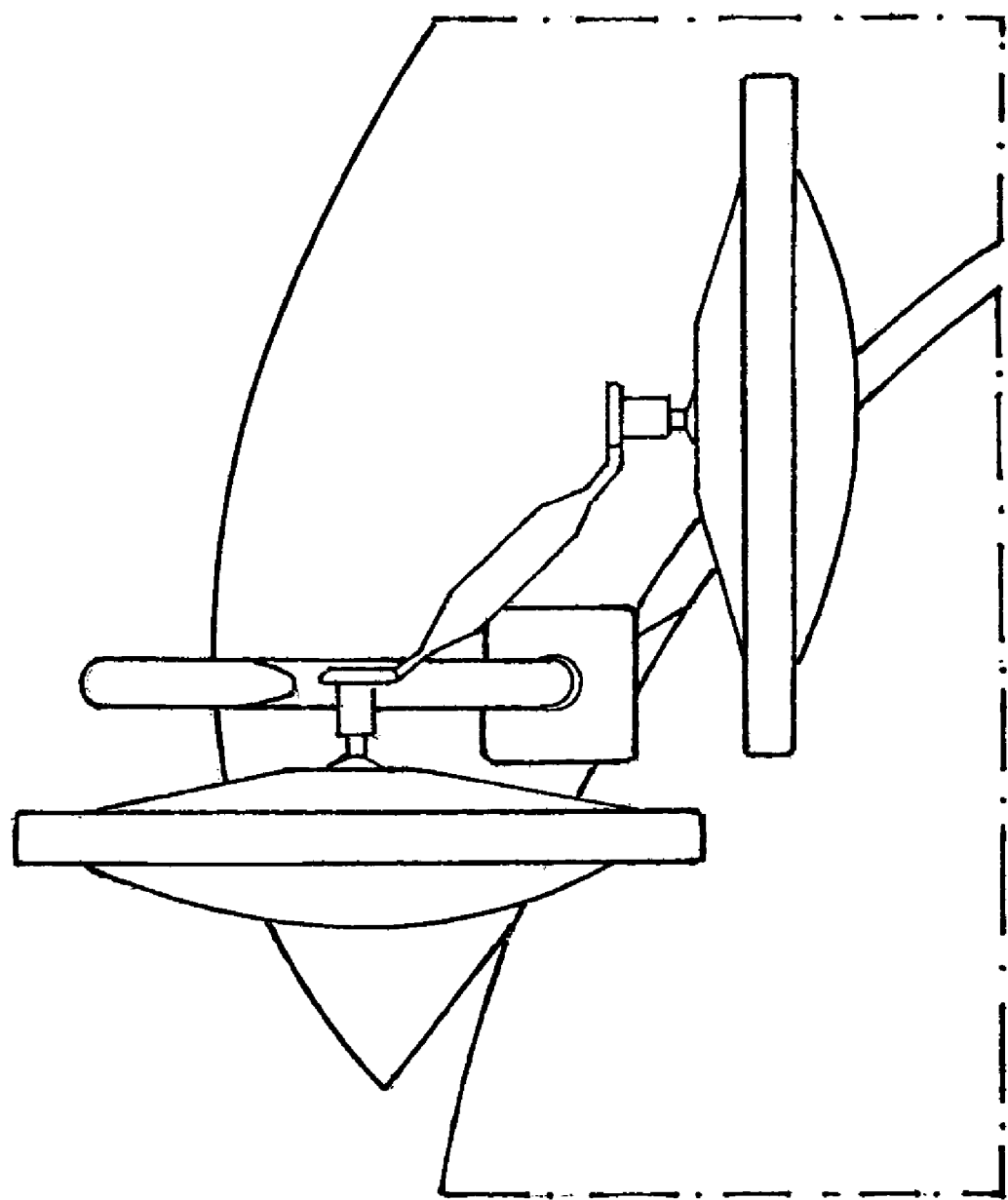
FIG. 16a is an enlargement of a portion of FIG. 16.

FIGS. 16 and 16a show a mirror assembly located on the very front portion of a vehicle fender, utilizing a mechanism that allows the mirror assembly to absorb an impact force directed from the front or the rear along the vehicle direction, as well as any force that is directed sideways. In either event, the mirror structure will swivel, rather than break, and moreover, if the impact does not turn the mirror more than 90°, will allow the mirror units to rebound, i.e., return, to their originally adjusted positions. While in the ensuing discussion, mirror assemblies are shown which utilize a pair of convex mirrors, a single, convex mirror may be utilized that provides an image both alongside and in front of the vehicle. Furthermore, while mirror units are being shown that have a circular periphery, any convex mirror shape may be utilized, including those with peripheral shapes that are oval or which have a peripheral shape that defines half of a circle or any mirror shape whatsoever.

Figure 10:
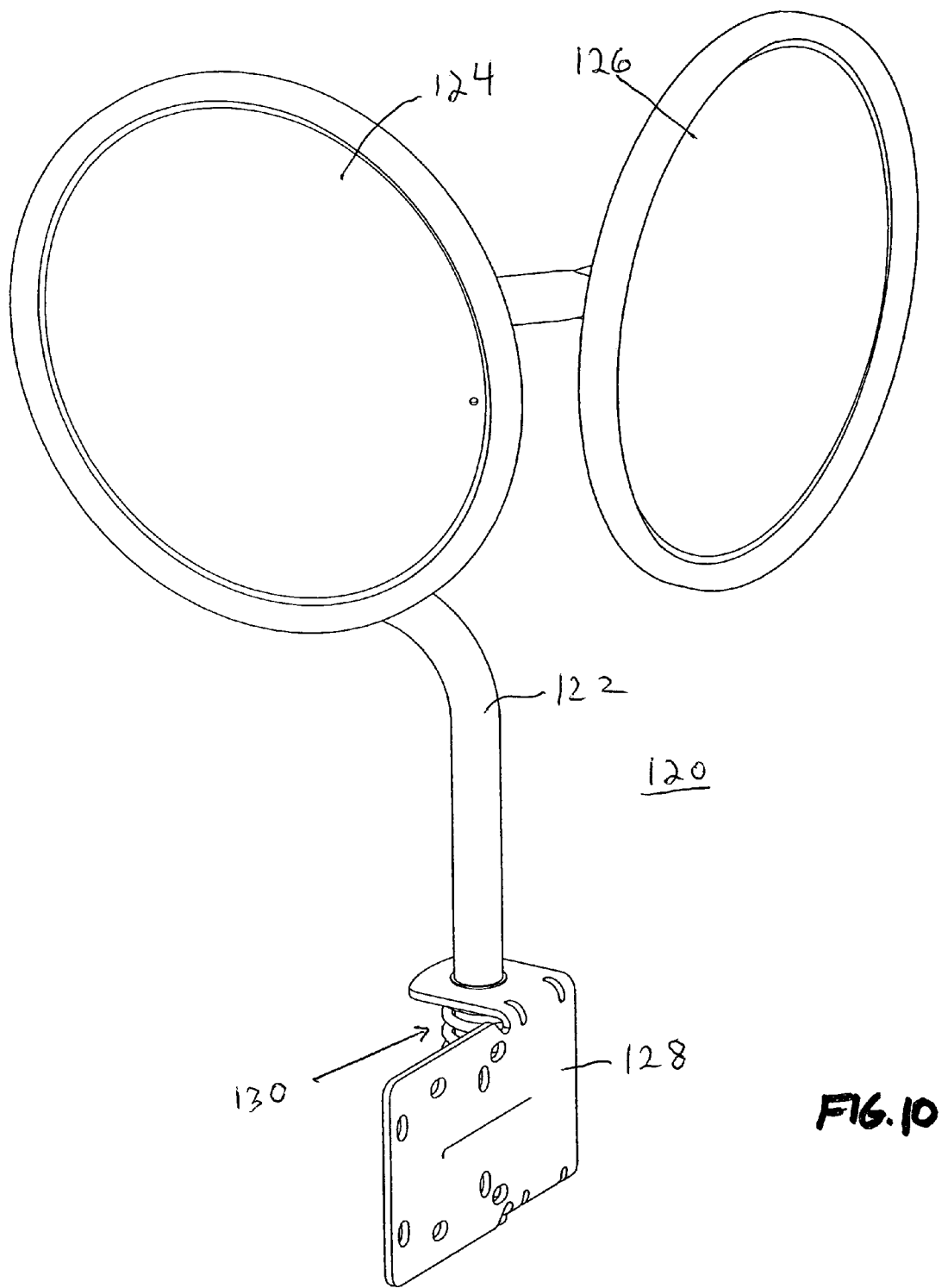
FIG. 10 perspectively shows a mirror assembly with a mounting mechanism that enables swiveling of the mirror unit and rebounding of the mirror unit to an original position.

Turning to FIG. 10, a mirror assembly 120 comprises a rotatable shaft or mirror pole 122 which is reentrantly bent as will be described, and which supports in accordance with the present embodiment, a pair of mirror units 124 and 126. These mirror units can be oriented so that one provides a view generally alongside a vehicle and the other along the front of the vehicle.

As noted, the mirror units which are supported by the main mirror pole 122 are secured to a vehicle body by support structure 128, which has at least one surface that can be attached to the vehicle by means of screws, bolts, or by soldering or by any known means of attachment. Also included is a swiveling and rebounding mechanism 130 which allows the pole 122 to swivel when the mirrors or the upper pole portion are struck by an accidental or deliberate force, so that the assembly can rotate clockwise or counterclockwise in reaction to such a force. Further, once the force is removed, the orientation of the mirror rebounds or returns to the original position, as shall be described.

Turning to FIG. 11, it is initially noted that the main mirror support pole 122 has a reentrantly bent section 122a which is disposed behind one of the mirrors 124 and an extension 122b, which leads and supports the second mirror 126. The mirror support structure 128' differs in minor details from the corresponding bracketry 128 in FIG. 10, but includes generally the same structure which allows the pole 122 to swivel and return or rebound to an original position.

With specific reference to FIG. 12, it can be seen that the swiveling and rebounding mechanism 130 comprises and includes, in accordance with one embodiment thereof, a vehicle mounting bracket 128 which includes a portion 128b with screw holes that enable securing the structure to a vehicle. The bracket 128 includes an upper inwardly directed flange 128d, which has a circular hole 120f for the passage therethrough of the free end of the pole 122. Juxtaposed to the flange 128d is a lower flange 128e with an opening 128g which allows the very distal end of the pole 122 to pass therethrough. Between the flanges 128d and 128e are disposed a spring 132, a washer 134, an upper and outer sleeve 138 which fits over and surrounds, as well as receives, a lower sleeve 140. The lower sleeve has cam surfaces 142a, 142b, 142c and 142d, as shown, and the upper sleeve 136 comprises corresponding and complimentary camming surfaces 136a, 136b etc. As clearly illustrated in FIG. 12, the camming surfaces of 142a, 142b, 142c and 142d of the lower sleeve extend circumferentially substantially around the lower sleeve 140. The washer 134 fits within a seat at the top of the upper sleeve 136. An opening 138 in the upper sleeve allows a pin 138a (FIG. 11 and FIG. 13) to penetrate through a hole in the shaft 122, as shown in FIG. 13. Therefore, the pole 122 rotates together with the upper sleeve 136. In contrast, the lower sleeve 140 is rotationally fixed to the lower flange 128e and is not rotatable relative to the bracket 128a.

In operation, therefore, if a rotational force is applied to the mirror unit or units at the other end of the pole 122, the mirror and its pole will rotate and, with it, rotate the upper sleeve 136 which will cause its camming surfaces to ride up and rise on the lower camming surfaces 142a, 142b, 142c and 142d. As long as the rotational force applied (whether clockwise or counterclockwise) displaces the pole less than 90°, as soon as the force is removed, the force applied by the spring 132 will cause the sleeve to counter-rotate the pole and so return the pole and its mirrors to their original position.

Figure 14:
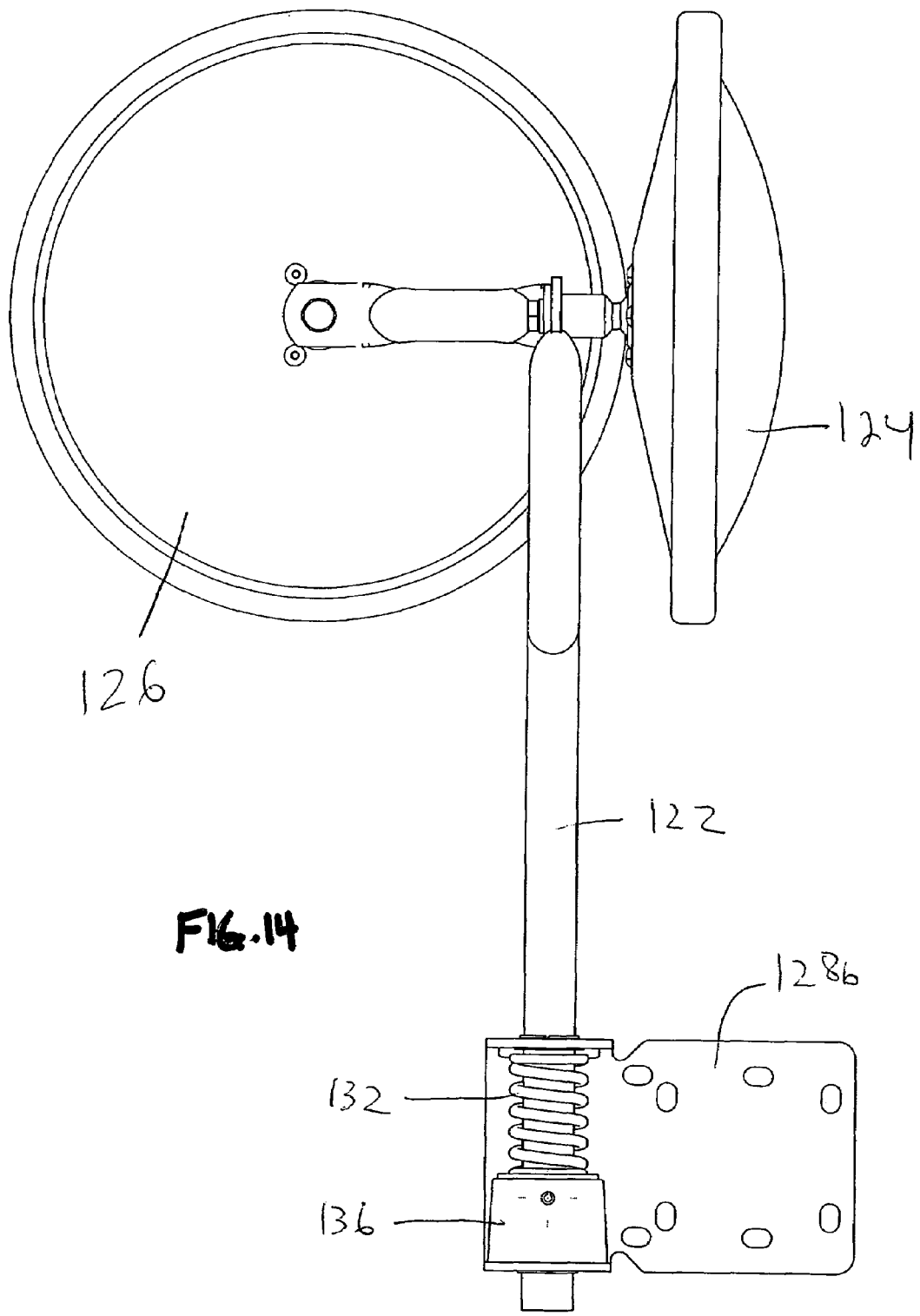
FIG. 14 shows the mirror assembly of FIG. 10 from a different direction.
Figure 15:
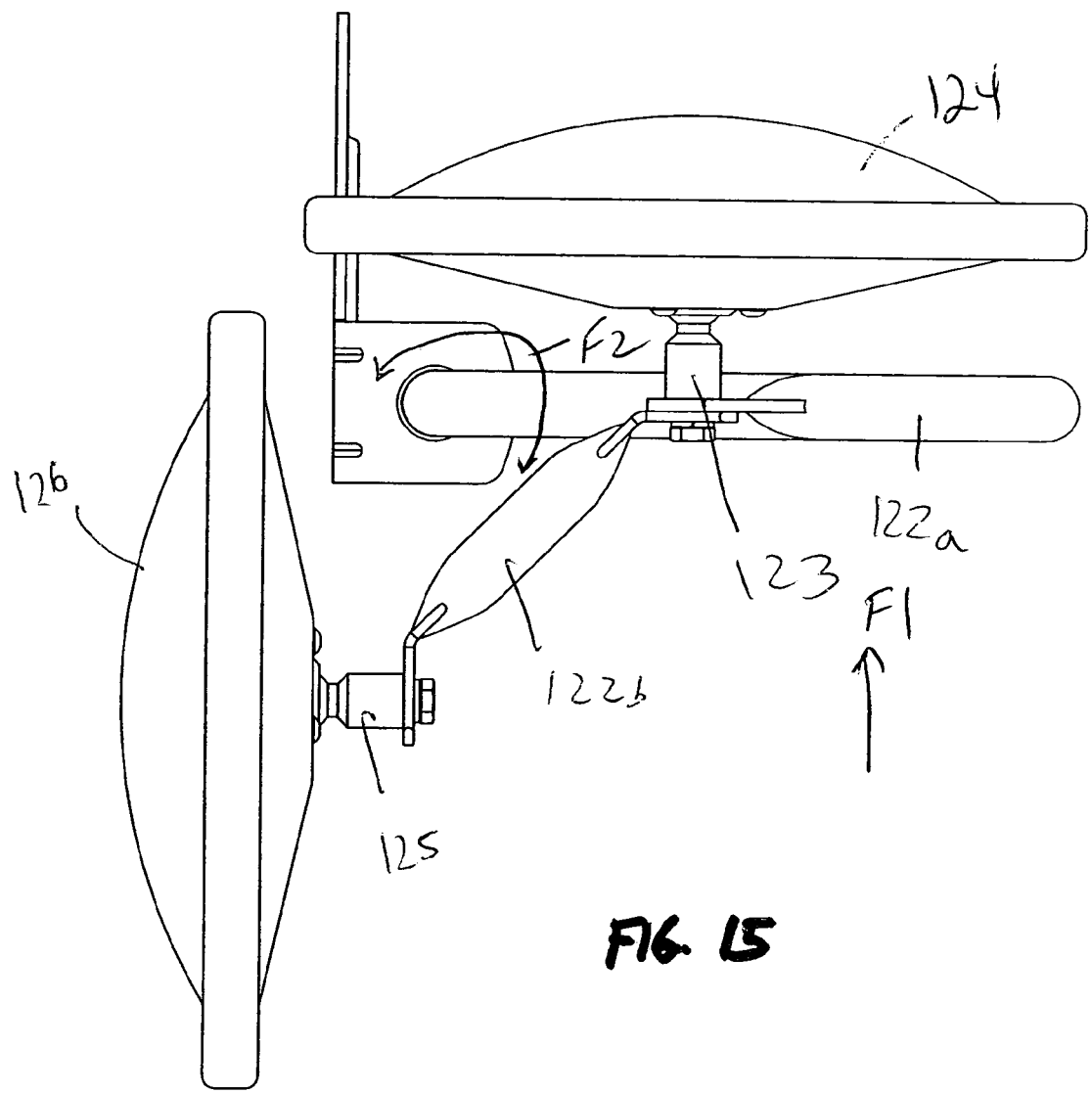
FIG. 15 provides a top view of FIG. 11.

The manner in which the upper sleeve 136 fits over and mates with the lower sleeve 140 can be seen in FIG. 13. FIG. 14 illustrates the completed assembly in an elevational view. As can be appreciated from FIG. 15, the portion 122a of the pole 122 is reentrantly bent and shaped so that it reaches out and protects the mirror 124 from any obstruction that may be typically encountered when the vehicle drives forward and its mirror encounters an impact from the direction of the arrow F1. That is, the pole portion 122a extends sufficiently away from the vehicle to be coextensive with the outer perimeter of the mirror 124, as shown. Thus, as described above, the mirror pole and its support structure allow the entire mirror assembly to swivel clockwise or counterclockwise, as indicated by the arrows F2 and the rebounding mechanism will return the mirror to its original orientation once the force is removed.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mirror system for facilitating driving of a vehicle, the system comprising:
   a mirror assembly that is suitable for being mounted to a vehicle body, wherein the vehicle body has a right side and a left side;
   at least one mirror arm having a mirror holding portion and a mounting portion;
   a mirror unit mechanically coupled to the mirror holding portion of the mirror arm;
   a mounting bracket having a first portion that is securable to the vehicle body, the mounting bracket having a mirror arm holding portion that defines a receiving opening in which the mounting portion of the mirror arm is pivotably supported, the mirror unit being so mounted that the mirror unit is at least partially disposed outwardly relative to one of the right side and the left side of the vehicle body, the mirror arm having a predetermined angular position relative to one side of the vehicle where it is positioned, and a range of movement that allows the mirror unit to swing, in response to a force, in clockwise and counterclockwise directions relative to the predetermined angular position, to end positions at which the mirror unit is not disposed outwardly relative to either side of the vehicle body; and
   a rebounding mechanism which is structured to return the mirror unit to the predetermined angular position from any position between the end positions to which it is pivoted by the force, upon removal of the force;
   wherein the rebounding mechanism comprises an upper sleeve which is rotatably interfitted with a lower sleeve, the upper sleeve and the lower sleeve comprising corresponding and complimentary camming surfaces which are resiliently biased toward one another to cause the camming surface of the upper sleeve to rise or descend on the camming surface of the lower sleeve, coming to a rest at a position which returns the mirror unit to the predetermined position, the upper sleeve surrounding and receiving the lower sleeve and the respective camming surfaces of each of the upper and lower sleeves are V-shaped and complimentary to each other and the camming surfaces of the lower sleeve extending circumferentially over substantially the entire circumference of the lower sleeve.

2. The mirror system of claim 1, wherein the rebounding mechanism has a structure that returns the mirror unit to the predetermined position when the mirror unit swings in either the clockwise or counterclockwise directions over a range of not more than 90°.

3. The mirror system of claim 1, wherein the at least one mirror arm comprises a re-entrantly bent mirror pole.

4. The mirror system of claim 1, wherein the rebounding mechanism includes a bracket with an upper inwardly directed flange and a lower flange and the upper and lower sleeves being mechanically disposed between the upper and the lower flanges.

5. The mirror system of claim 1, wherein the upper sleeve is constructed to fit over and surround, as well as receive, the lower sleeve.

6. The mirror system of claim 5, wherein the lower sleeve is mechanically fixed to a flange of the rebounding mechanism and the upper sleeve is mounted to be rotatable relative to the flange.

7. The mirror system of claim 6, wherein a distal portion of the at least one mirror arm is mounted so that it penetrates through the upper sleeve, the lower sleeve and the flange.

8. The mirror system of claim 1 wherein the upper and lower sleeves are resiliently biased toward one another with a spring.

9. The mirror system of claim 1, the mirror unit comprising a convex mirror.

10. The mirror system of claim 1, wherein the at least one mirror arm comprises a portion that is shaped to protect the mirror unit against contacting obstructions.

11. The mirror system of claim 1, in which the at least one mirror arm comprises a plurality of mirror support arms.

12. The mirror system of claim 1, in combination with a front fender of a vehicle, wherein the mounting bracket is attached to the front fender of the vehicle.

* * * * *